UNITED STATES PATENT OFFICE.

AZARIAH F. CROWELL, OF WOOD'S HOLL, MASSACHUSETTS.

IMPROVEMENT IN FERTILIZERS.

Specification forming part of Letters Patent No. 208,224, dated September 24, 1878; application filed July 25, 1878.

*To all whom it may concern:*

Be it known that I, AZARIAH F. CROWELL, of Wood's Holl, of the county of Barnstable and State of Massachusetts, have invented a new and useful Improvement in the Manufacture of Fertilizers; and do hereby declare the same to be described as follows:

The special object of my invention is the utilization of a gelatinous and non-oleaginous liquid matter, which heretofore has been allowed to go to waste, such matter being the nitrogenous fluid extracted, with oil, from menhaden or fish, under pressure, and subsequently separated from the oil in order to obtain such oil in a proper state for use.

In carrying out my invention, I take a quantity of such waste nitrogenous and gelatinous fluid, and with it, in a suitable vessel or tank, I thoroughly mix, in a sufficient amount for the purpose, a superphosphate. Next, I allow the mixture to settle, after which I remove from it the insoluble substance or substances, and evaporate the remainder to the necessary consistency, or to dryness, if desirable.

In this way, by a fluid heretofore considered valueless, I am enabled to extract from superphosphates the soluble parts thereof, and to combine therewith nitrogenous matter, and thereby produce a fertilizing material of much value to agriculturists.

In making the composition, I usually employ for about one part of the superphosphate four parts, by measure, of the piscinal fluid. The oil, by its specific levity, is usually separated from the piscinal fluid, such oil being subsequently removed by skimming or drawing it from such fluid.

I am aware that it is not new to treat the aforesaid piscinal fluid with chemical agents in order to retard the formation of ammoniacal compounds, and to fix any such which may be found during concentration of such fluid, and subsequently to mix it with a phosphatic base in order to produce a fertilizer.

In making a fertilizer by my process, I use the piscinal fluid in its normal condition without treating it with chemical agents, otherwise than mixing it with a superphosphate and removing from the solution the insoluble matters thereof. Thus my process involves such removal, it being one step of such process, and consequently not only does my process differ from the other above mentioned, (viz., in not using chemical agents to retard the formation of ammoniacal compounds, and in removing from the phosphatic solution the insoluble matters,) but the resulting product differs from that of the other process, as the latter has in it more of the insoluble matters and none of the chemical agents used for the purpose or purposes mentioned.

What therefore I claim as my invention is as follows, viz:

1. The product or fertilizing compound resulting from the process as herein described, such product consisting of the combination of the above-named piscinal fluid and the soluble portions of a superphosphate.

2. The process, substantially as described, of producing the aforesaid new fertilizer, such consisting in mixing a superphosphate with the described non-oleaginous piscinal fluid and removing the insoluble matter, and subsequently evaporating the solution to dryness, or to such degree as may be required.

AZARIAH F. CROWELL.

Witnesses:
R. H. EDDY,
JOHN R. SNOW.